United States Patent
Ono et al.

[19]

[11] Patent Number: 5,997,083
[45] Date of Patent: Dec. 7, 1999

[54] VEHICLE SEAT WITH HEIGHT ADJUSTABLE SEAT CUSHION

[75] Inventors: Daisuke Ono; Yasushi Yoshikawa, both of Toyota, Japan

[73] Assignee: Araco Kabushiki Kaisha, Aichi-ken, Japan

[21] Appl. No.: 08/915,302

[22] Filed: Aug. 19, 1997

[30] Foreign Application Priority Data

Aug. 20, 1996 [JP] Japan ................................. 8-218841

[51] Int. Cl.⁶ ........................................................ B60N 2/30
[52] U.S. Cl. ......................... 297/237; 297/236; 297/339
[58] Field of Search .................................. 297/338, 339, 297/284.3, 284.9, 237, 236, 284.11, 235, 234, 75

[56] References Cited

U.S. PATENT DOCUMENTS

| | | | |
|---|---|---|---|
| 78,304 | 5/1868 | Martin ........................................ | 297/75 |
| 168,490 | 10/1875 | Hern et al. ................................ | 297/235 |
| 265,606 | 10/1882 | Jackson ................................ | 297/236 X |
| 2,317,894 | 4/1943 | Doty ...................................... | 297/338 X |
| 2,914,113 | 11/1959 | Fletcher ................................ | 297/75 X |
| 3,096,118 | 7/1963 | Dubeck .................................... | 297/75 |
| 4,856,844 | 8/1989 | Isono ................................ | 297/284.9 X |
| 5,435,623 | 7/1995 | Kapec et al. ................... | 297/284.11 X |
| 5,660,437 | 8/1997 | Bauer et al. ............................ | 297/237 |

FOREIGN PATENT DOCUMENTS

| | | | |
|---|---|---|---|
| 690433 | 7/1964 | Canada ....................................... | 297/75 |
| 666194 | 12/1994 | European Pat. Off. . | |
| 66839 | 9/1957 | France ................................... | 297/237 |
| 1217406 | 5/1960 | France ................................... | 297/237 |
| 2328399 | 1/1975 | Germany ................................ | 297/75 |
| 2807064 | 8/1979 | Germany ............................. | 297/237 |
| 4412617 | 10/1994 | Germany ......................... | 297/284.11 |
| 52-71020 | 6/1977 | Japan . | |
| 0215132 | 9/1986 | Japan ................................ | 297/284.9 |
| 403267011 | 11/1991 | Japan .................................... | 297/237 |
| 879229 | 10/1961 | United Kingdom ..................... | 297/75 |

*Primary Examiner*—Peter M. Cuomo
*Assistant Examiner*—David E. Allred
*Attorney, Agent, or Firm*—Hazel & Thomas, P.C.

[57] ABSTRACT

A vehicle seat, the seat cushion of which is divided into front and rear cushions in a fore-and-aft direction. The front cushion is rotatably mounted at its front-side lower end on a front end of a cushion frame of the vehicle seat to be tilted forward or backward. The rear cushion is placed behind the front cushion and supported by a lift mechanism mounted on a rear portion of the cushion frame. The lift mechanism is interlocked with the front cushion to raise the rear cushion to an upper position when the front cushion is tilted forward and to lower the rear cushion and place it behind the front cushion on the cushion frame in a horizontal condition when the front cushion is tilted backward and placed on the cushion frame.

2 Claims, 9 Drawing Sheets

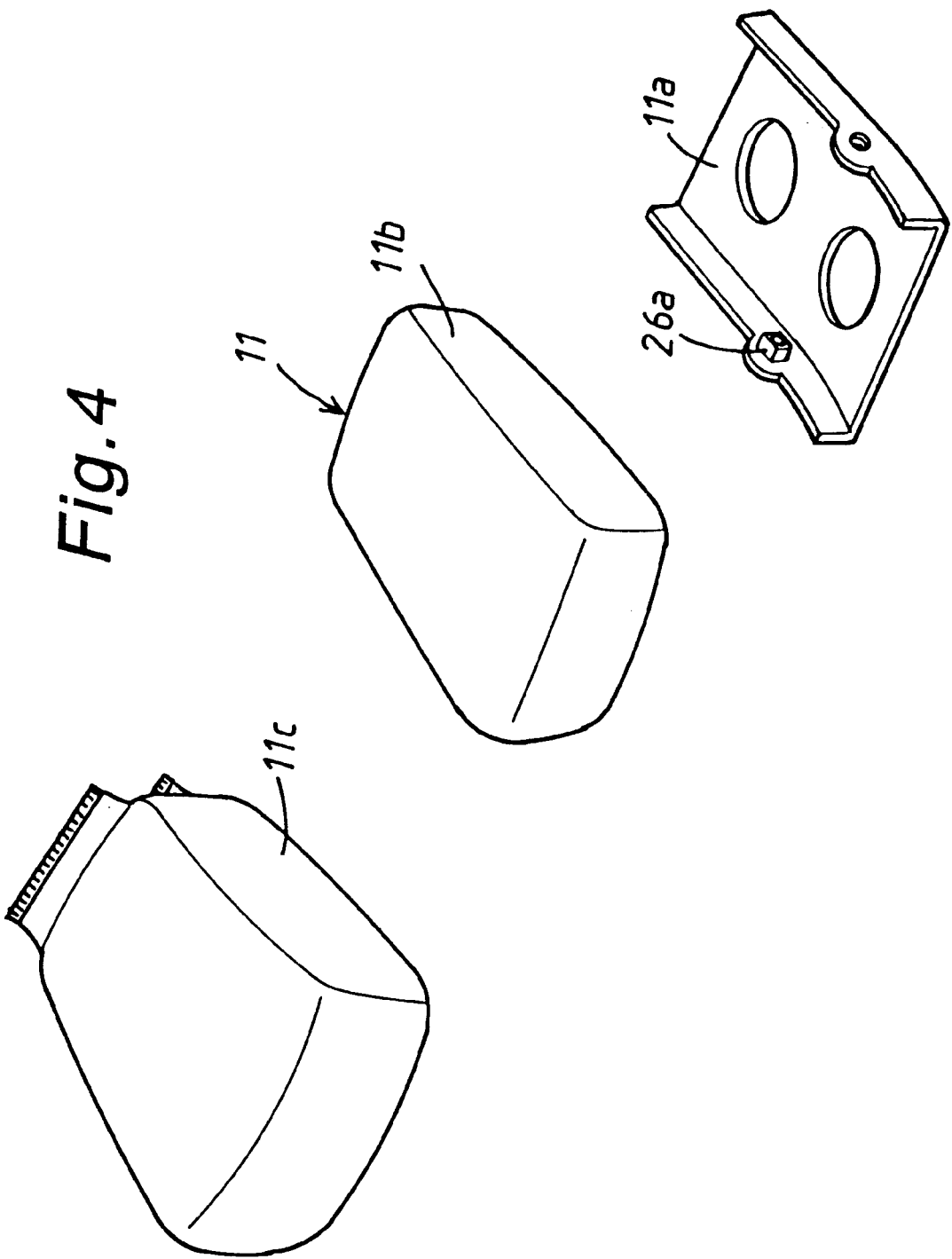

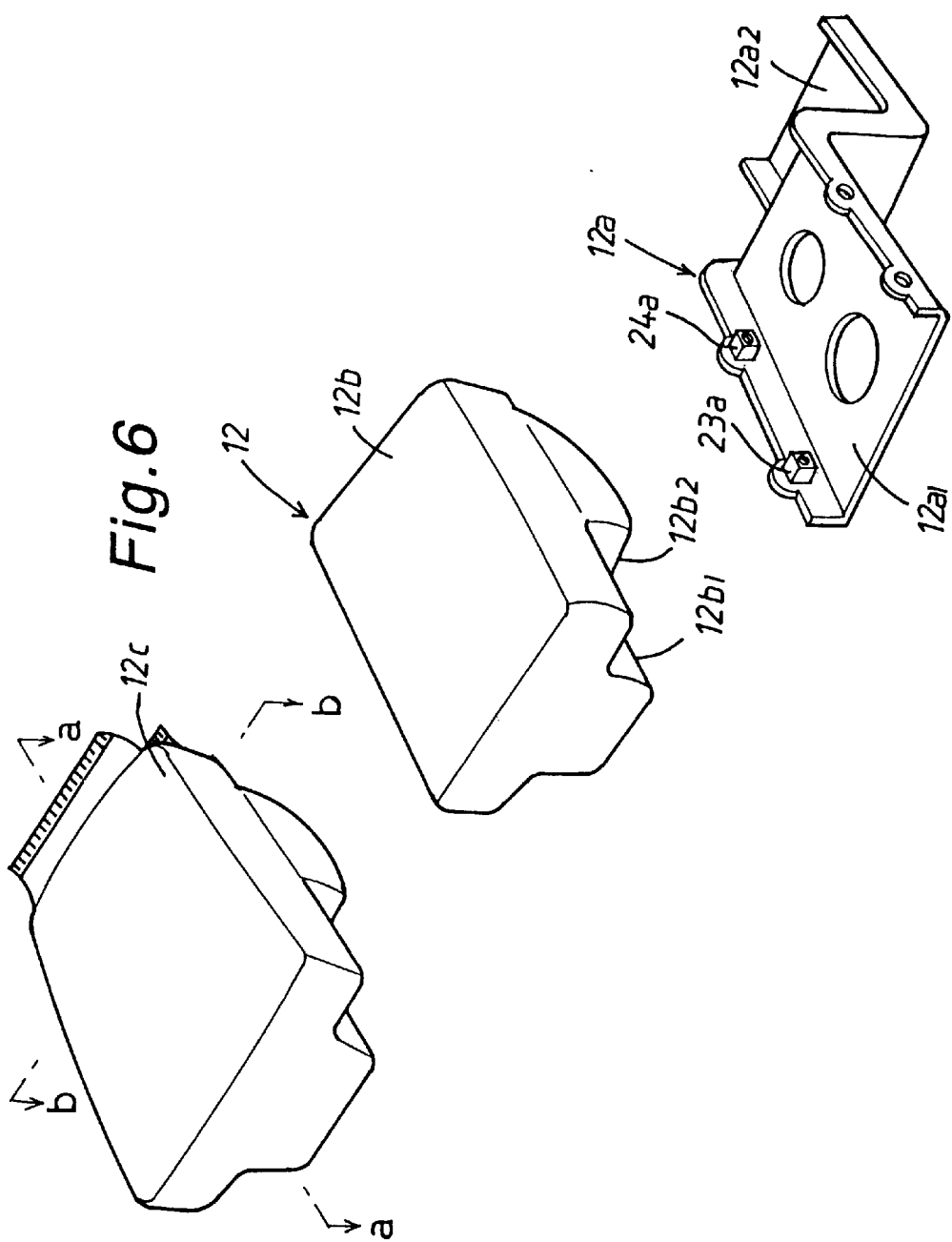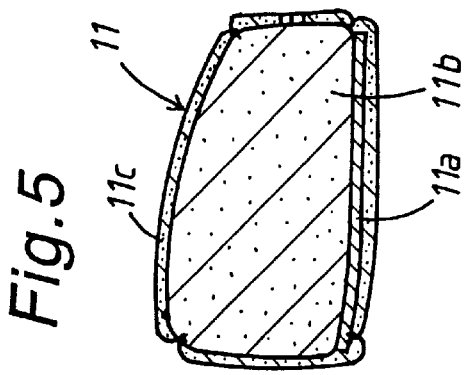

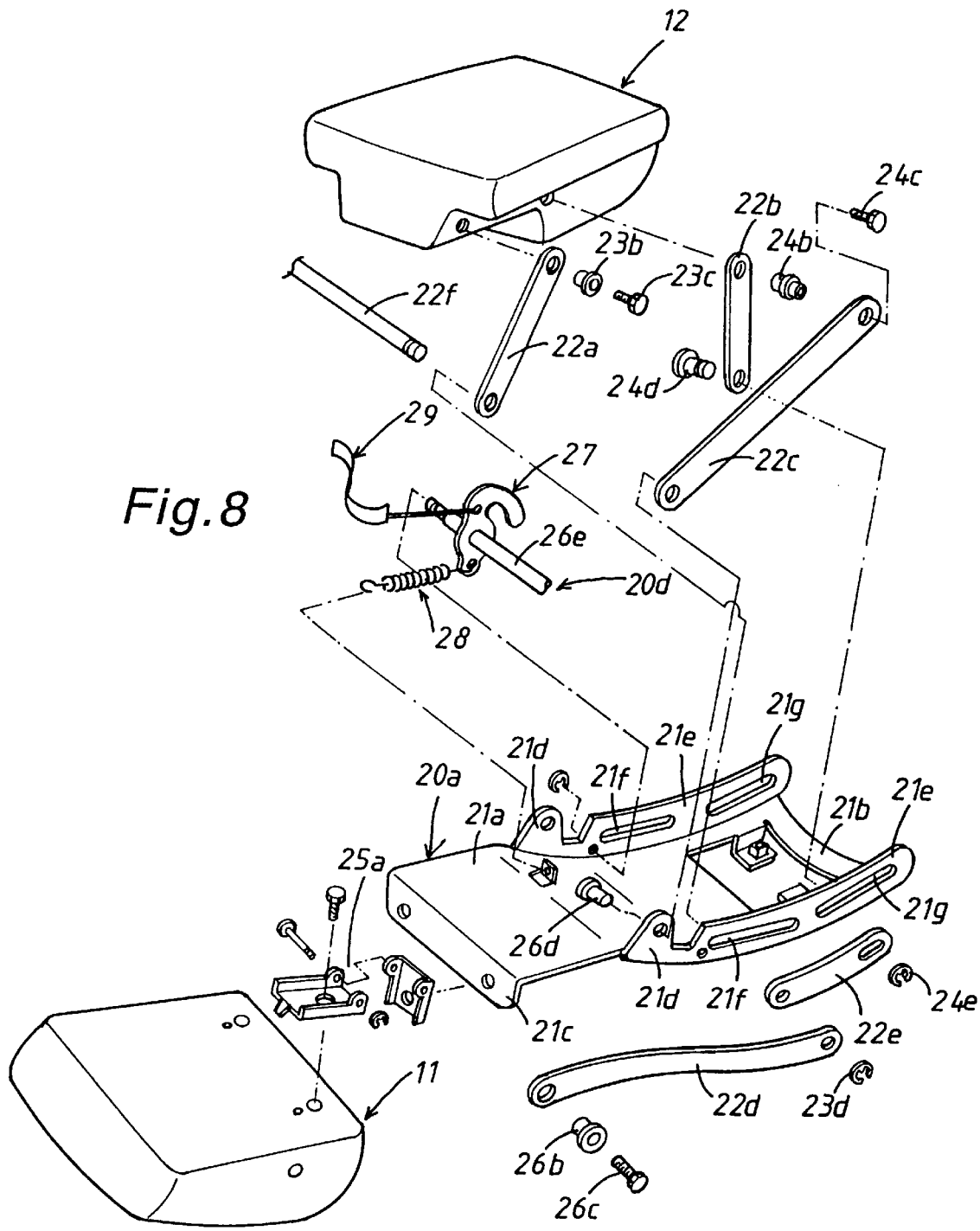

VEHICLE SEAT WITH HEIGHT ADJUSTABLE SEAT CUSHION

BACKGROUND OF THE INVENTION

1. Field of the Invention

The present invention relates to a vehicle seat, and more particularly to a vehicle seat with a height adjustable seat cushion.

2. Description of the Prior Art

In Japanese Patent Laid-open Publication No. 52(1977)-71020, there has been proposed a vehicle seat, the seat cushion of which is composed of a cushion body mounted on a cushion frame and a movable cushion assembled within the cushion body and supported by a lift mechanism to be raised to an upper position for child use or moved down to a lower position where the seating surface of the movable cushion is placed at the same height as that of the cushion body for adult use.

Since in the vehicle seat, the movable cushion is completely separated from the cushion body when lifted to the upper position, an infant or child seated on the movable cushion may not be maintained in a stable manner as both of his legs are afloat in the air. It is, therefore, desirable that the infant or child can be supported at his legs in a stable manner.

In European Patent No. 0666194, there has been proposed a vehicle seat, the seat cushion of which is divided-into three cushions in a fore-and-aft direction. The front cushion of the vehicle seat is rotatably mounted on a front end of a cushion frame at its front-side lower end to be tilted forward or backward, and the intermediate cushion is rotatably connected at its rear-side lower end to a front-side lower end of the rear cushion supported by a lift mechanism. In the vehicle seat, the rear cushion is raised by the lift mechanism to provide a seat cushion for child use, and the front cushion is tilted forward to provide a foot rest for a child seated on the rear cushion. Thus, the child seated on the rear cushion can be supported in a stable manner as both of his legs and femurs are placed on the front and intermediate cushions.

In the vehicle seat, however, the rear cushion is shortened in the fore-and-aft direction since the seat cushion is divided into three portions. As a result, the rear cushion may not be a comfortable seat for child use. In addition, if the thickness of the seat cushion is increased to provide a comfortable seat for child use, a front-side upper edge of the rear cushion would be spaced a large distance from a tear-side upper edge of the intermediate cushion. This causes a sense of incongruity for a user. On the contrary, if the thickness of the seat cushion is reduced to eliminate such a space between the intermediate and rear cushions, the seating comfort of the rear cushion is deteriorated.

SUMMARY OF THE INVENTION

It is, therefore, a primary object of the present invention to provide a vehicle seat with a height adjustable seat cushion capable of overcoming the problems discussed above.

According to the present invention, there is provided a vehicle seat, the seat cushion of which is divided into front and rear cushions in a fore-and-aft direction, wherein. The front cushion is rotatably mounted at its front-side lower end on a front end of a cushion frame of the vehicle seat to be tilted forward or backward. The rear cushion is placed behind the front cushion and supported by a lift mechanism mounted on a rear portion of the cushion frame. The lift mechanism is interlocked with the front cushion to raise the rear cushion to an upper position when the front cushion is tilted forward and to lower the rear cushion and place it behind the front cushion on the cushion frame in a horizontal condition when the front cushion is tilted backward and placed on the cushion frame.

In a practical embodiment of the present invention, the lift mechanism is composed of a pair of link mechanisms mounted on a base plate fixedly placed on the cushion frame. The base plate has a pair of laterally spaced upward side flanges each formed with front and rear guide grooves in the fore-and-aft direction of the cushion frame. The link mechanisms each include a pair of front and rear link members rotatably connected at their upper ends to a side portion of the rear cushion and supported at their lower ends on each upward side flange of the base plate in such a manner as to be displaced forward or backward along the front and rear guide grooves, a support leg rotatably connected at its lower end to a front end of each upward side flange of the base plate and at its upper end to the side portion of the rear cushion together with the upper end of the rear link member, a support arm rotatably connected at its rear end to the lower end of the front link member and connected at its front end to a side portion of the front cushion at a position behind a rotation fulcrum of the front cushion, and a connecting member rotatably connected at its front end to the lower end of the front link member and at its rear end to the lower end of the rear link member.

BRIEF DESCRIPTION OF THE DRAWINGS

Other objects, features and advantages of the present invention will be more readily appreciated from the following detailed description of a preferred embodiment thereof when taken together with the accompanying drawings, in which:

FIG. 4 is a perspective view illustrating component parts of a front cushion of the vehicle seat shown in FIGS. 1 and 2;

FIG. 5 is a vertical sectional view of the front cushion;

FIG. 6 Is a perspective view illustrating component parts of a rear cushion of the vehicle seat shown in FIGS. 1 and 2;

FIG. 7(*b*) is a vertical sectional view taken along line b—b in FIG. 6;

FIG. 8 is a perspective view illustrating component parts of the lift mechanism shown in FIG. 3;

FIG. 9(*b*) is a vertical sectional view of a connecting portion shown by an arrow (b) in FIG. 3;

FIG. 9(*c*) is a vertical sectional view of a connecting portion shown by an arrow (c) in FIG. 3;

FIG. 9(*d*) is a vertical sectional view of a connecting portion shown by an arrow (d) in FIG. 3:

FIG. 9(*e*) is a vertical sectional view of a connecting portion shown by an arrow (e) in FIG. 3;

DESCRIPTION OF THE PREFERRED EMBODIMENT

Figure 1:
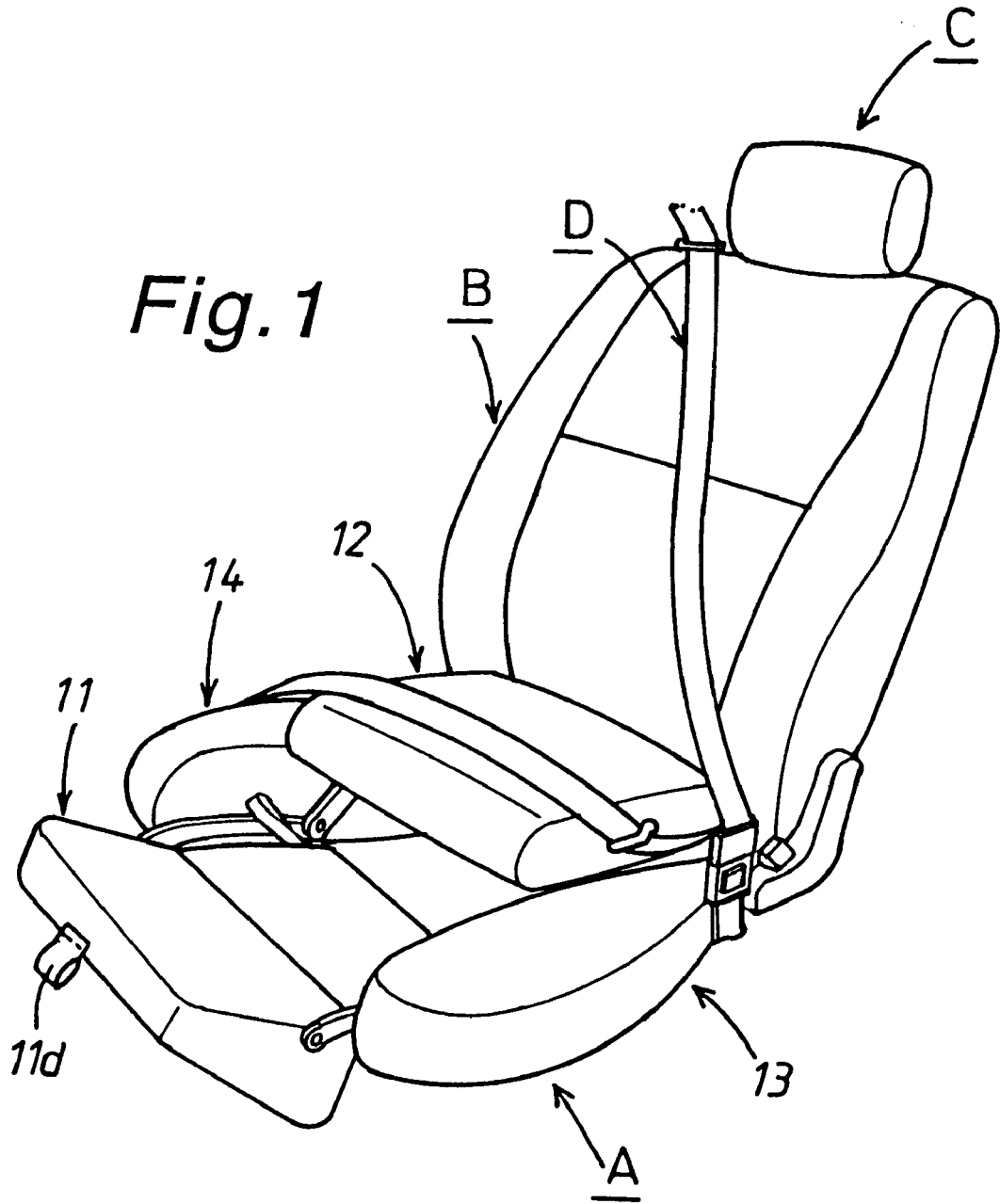
FIG. 1 is a perspective view of a vehicle seat with a height adjustable seat cushion in accordance with the present invention, wherein the seat cushion is adjusted for child use.
Figure 2:
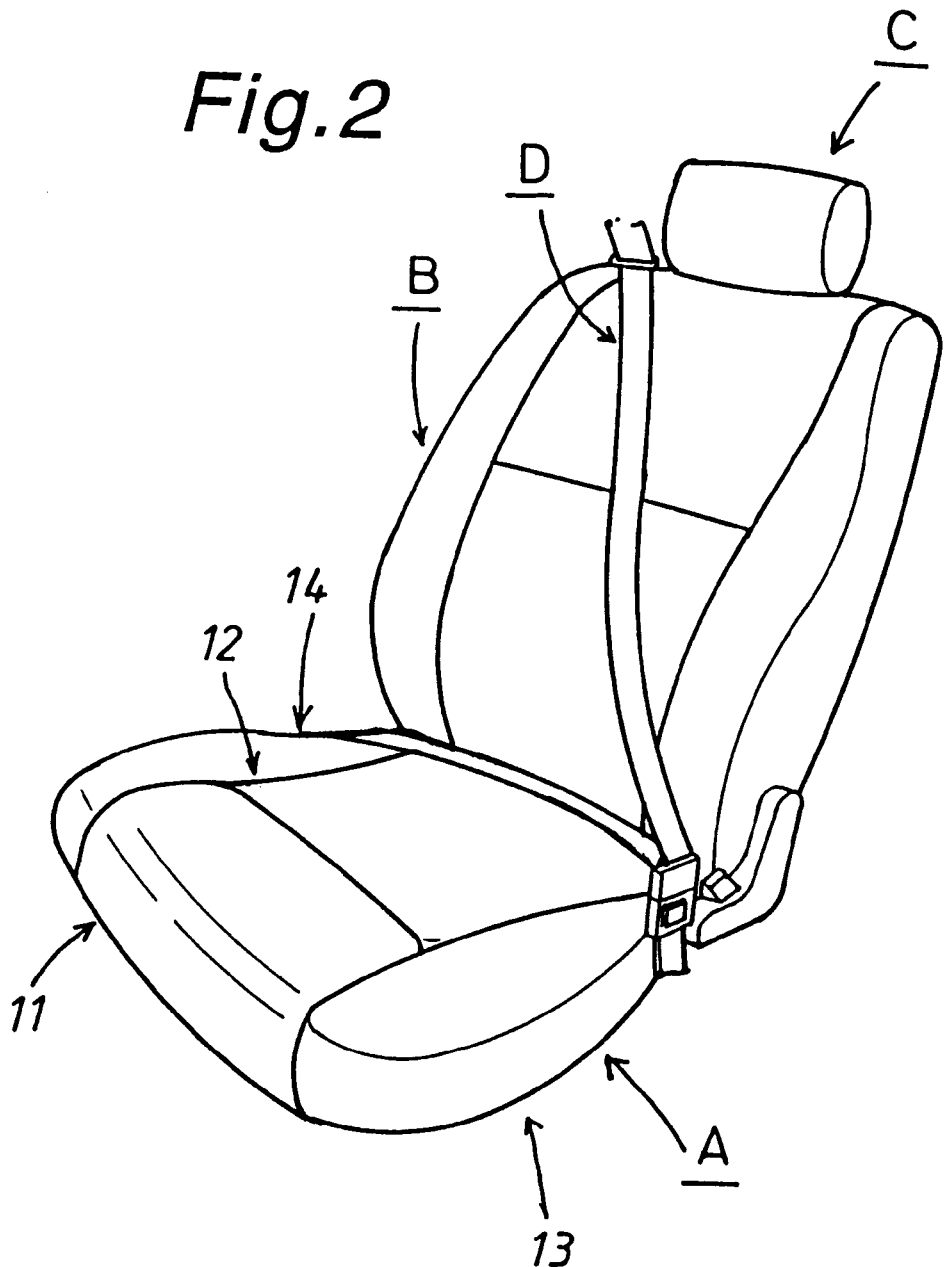
FIG. 2 is a perspective view of the vehicle seat, wherein the seat cushion is adjusted for adult use.
Figure 3:
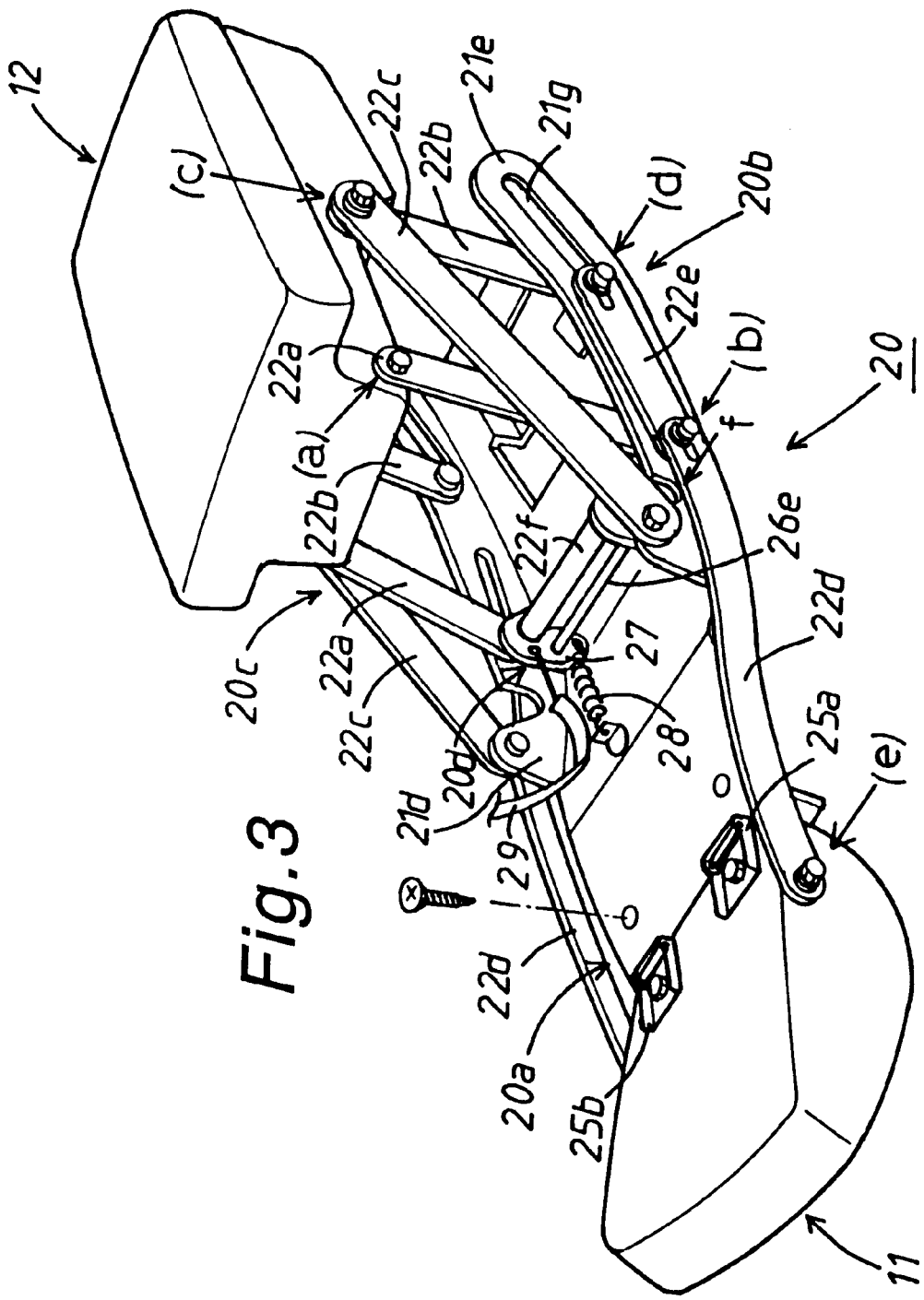
FIG. 3 is a perspective view of a lift mechanism assembled with the vehicle seat shown in FIGS. 1 and 2.

Illustrated in FIGS. 1 and 2 of the drawings is a vehicle seat with a height adjustable seat cushion in accordance with the present invention. The vehicle seat is composed of a seat cushion A, a backrest B, a headrest C and a seat belt assembly D. The seat cushion A is divided into a front cushion 11 and a rear cushion 12 which are contained within a recessed portion formed by a pair of laterally spaced side cushions 13 and 14. As shown in FIG. 3, the front and rear cushions 11 and 12 are supported by a link mechanism 20 to be raised from the recessed portion between the side cushions 13 and 14.

Figure 7A:
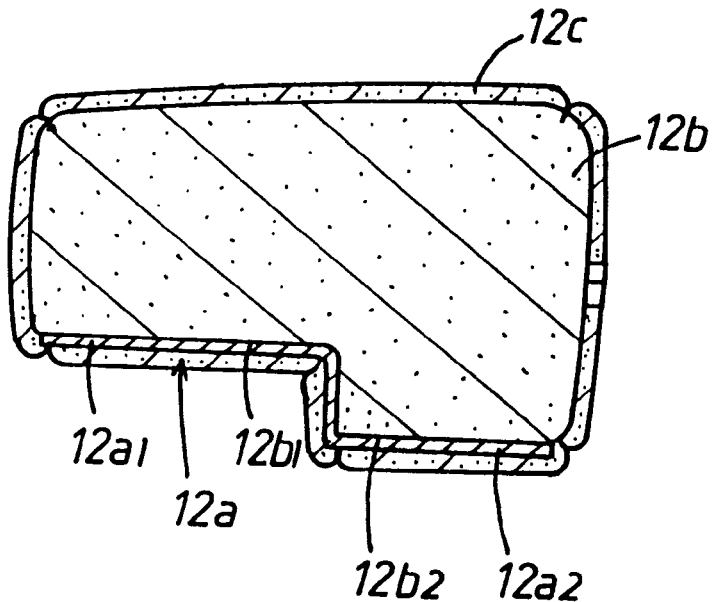
FIG. 7(*a*) is a vertical sectional view taken along line a—a in FIG. 6.
Figure 7B:
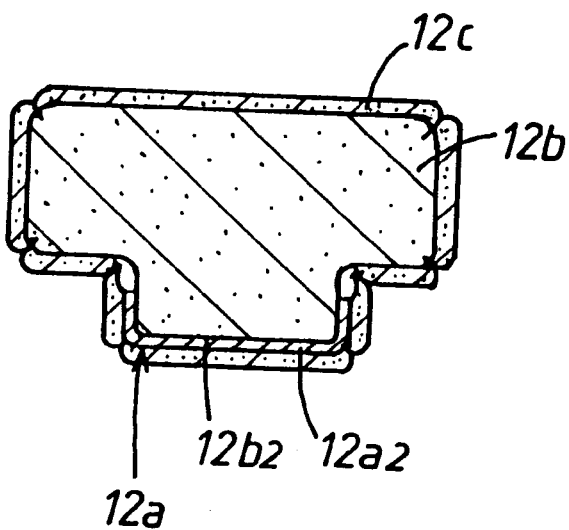

As shown in FIGS. 4 and 5, the front cushion 11 is composed of a support plate 11a made of sheet metal, a cushion pad 11b and a cushion cover 11c. The cushion pad 11b is covered with the cushion cover 11c in a condition where it has been positioned on the support plate 11a. As shown in FIGS. 6 and 7, the rear cushion 12 is composed of a support plate 12a of sheet metal, a cushion pad 12b and a cushion cover 12c. The support plate 12a is bent in front and rear steps to form a front support portion 12a1 and a rear support portion 12a2. The cushion pad 12b is formed in a T-letter shape in cross-section to be received by the front and rear portions 12a1 and 12a2 of support plate 12a at its front and rear bottom surfaces 12b1 and 12b2. The cushion cover 12c is formed in the same configuration as that of the cushion pad 12b. The cushion pad 12b is covered with the cushion cover 12c in a condition where it has been positioned on the support plate 12a.

As shown in FIGS. 3 and 8, the lift mechanism 20 includes a base plate 20a, a pair of link mechanisms 20b, 20c and a retention mechanism 20d. The base plate 20a has a horizontal front portion 21a formed at its front end with a downward front flange 21c and a downwardly curved rear portion 21b formed at its opposite sides with a pair of laterally spaced upward front flanges 21d and a pair of laterally spaced upward rear flanges 21e. The rear flanges 21e are formed longer than the front flanges 21d in a fore-and-aft direction and extended along the rear portion 21b of base plate 20a. The rear flanges 21e of base plate 20a each are formed with a pair of spaced guide grooves 21f and 21g.

Figure 9E:
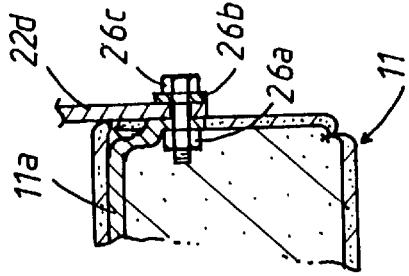
FIG. 9(*a*) is a vertical sectional view of a connecting portion shown by an arrow (a) in FIG. 3.
FIG. 9(f) is a vertical sectional view of a connecting portion shown by an arrow (f) in FIG. 3.
Figure 9F:
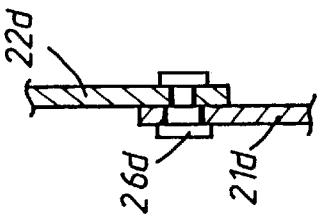

The link mechanism 20b has the same construction as that of the link mechanism 20c. The link mechanisms 20b, 20c each are composed of a pair of front and rear link members 22a and 22b, a support leg 22c, a support arm 22d, a connecting member 22e and a lateral connecting rod for interconnecting the link mechanisms 20b and 20c. As shown in FIGS. 9(a)–9(f), The link members 22a, 22b and support leg 22c are arranged to support the rear cushion 12, the support arm 22d is arranged to connect the front link member 22a to the front cushion 11, and the connecting member 22e is arranged to interconnect the front and rear link members 22a and 22b. As shown in FIG. 9(a), the front link member 22a is rotatably connected at its upper end to a side portion of the rear cushion 12 by means of a bolt 23c threaded through a bush 23b into a nut 23a welded to a side flange of the front support portion 12a1 of support plate 12a. As shown In FIG. 9(b), the front link member 22a is welded at its lower end to the lateral connecting rod 22f which is slidably engaged with the front guide groove 21f of base plate 20a. At the lower end of front link member 22a, the front end of connecting member 22e and the rear end of support arm 22d are rotatably supported by an outer end of the connecting rod 22f and retained in place by means of a retainer ring 23d. Thus, the lower end of front link member 22a is rotatably connected to the rear end of support arm 22d and the front end of connecting member 22e through the connecting rod 22f and is slidably supported by the front guide groove 21f of base plate 20a to be moved forward or backward.

Figure 9C:
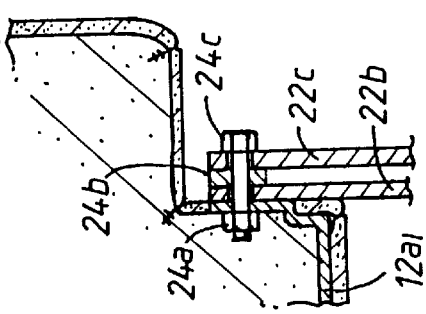
Figure 9D:
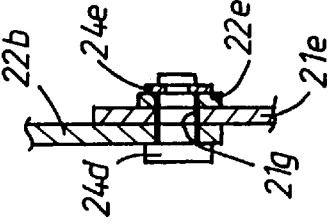
Figure 9A:
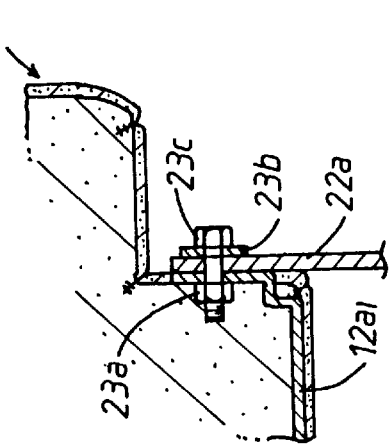
Figure 9B:
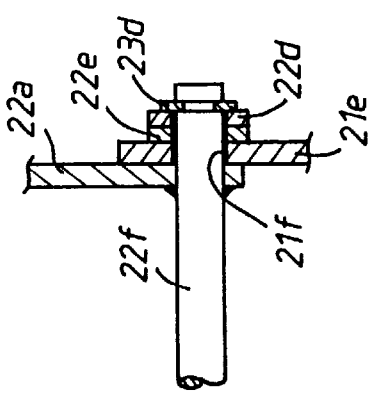

As shown in FIG. 9(c), the rear link member 22b is rotatably connected at its upper end to the side portion of rear cushion 12 together with the upper end of support leg 22c by means of a bolt 24c threaded through a bush 24b into a nut 24a welded to the side flange of the front portion 12a1 of support plate 12a at a position spaced rearward at a predetermined distance from the upper end of front link member 22a. As shown in FIG. 9(d), the lower end of rear link member 22b is rotatably supported by a support pin 24d which is slidably engaged with the rear guide groove 21g of base plate 20a. At the lower end of rear link member 22b, the rear end of connecting member 22e is rotatably supported by an outer end of support pin 24d and retained in place by means of a retainer ring 24e. Thus, the lower end of rear link member 22b and the rear end of connecting member 22e are rotatably connected with each other and guided by the rear guide groove 21g to be moved forward or backward. In such a condition described above, the front and rear link members 22a and 22b are interconnected by means of the connecting member 22e, and the pair of front link members 22a, 22a are interconnected by means of the connecting rod 22f.

In the link mechanisms 20b and 20c, the length of connecting member 22e is to be determined equal to the space between the upper ends of front and rear link members 22a and 22b so that a parallel linkage is constructed by the link members 22a and 22b. In addition, the pair of support arms 22d, 22d are rotatably connected at their front ends to opposite side portions of the front cushion 11. As shown in FIGS. 3 and 8, the front cushion 11 is rotatably mounted on the front downward flange 21c of base plate 20a by means of a pair of hinge pins 25a and 25b to be tilted forward or backward and is rotatably connected to the front ends of support arms 22d, 22d at its opposite side portions at a position spaced rearward from its rotation fulcrum. As shown in FIG. 9(e), the front ends of support arms 22d, 22d each are rotatably connected to each side portion of front cushion 11 by means of a bolt 26c threaded through a bush 26b into a nut 26a welded to a side flange of support plate 11a. As shown in FIGS. 3 and 9(f), the pair of support legs 22c are rotatably connected at their lower ends to the front upward flanges 21d of base plate 20a by means of a pair of support pins 26d.

As shown in FIGS. 3 and 8, the retention mechanism 20d is composed of a lateral support rod 26e rotatably supported by the rear-side upward flanges 21e of base plate 20a at their front ends, a hook 27 fixed to the support rod 26e, a tension coil spring 28 engaged at its one end with the front portion 21a of base plate 20a to bias the hook 27 in a clockwise direction, and an operation string 29 connected to the hook 27 to rotate the support rod 26e against the biasing force of tension spring 28. The hook 27 is located in front of the connecting rod 22f to be engaged with the connecting rod 22f when rotated against the biasing force of tension spring 28 by abutment therewith.

Figure 10A:
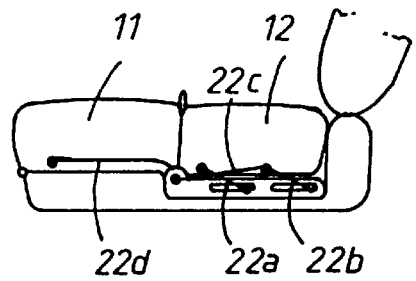
FIG. 10(a)–10(c) schematically illustrate adjustment modes of the vehicle seat for adult use and child use.
Figure 10B:
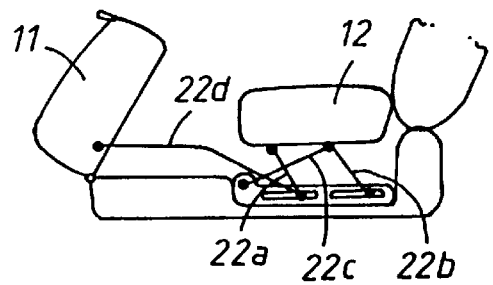
Figure 10C:
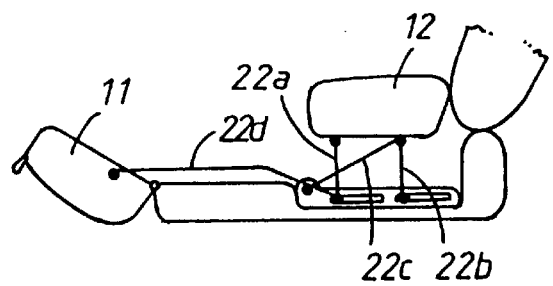

When the lift mechanism 20 is mounted on the cushion frame of the vehicle seat in a condition assembled as shown in FIG. 3, the base plate 20a is fixedly mounted on the cushion frame. When the front cushion 11 is placed on the front portion 21a of base plate 20a in a horizontal condition, the lower ends of link members 22a, 22b are moved backward by the support arms 22d and retained at the rear ends of front and rear guide grooves 22f and 22g so that the link members 22a, 22b are moved down in a forward direction as shown in FIG. 10(a). In such a condition, the rear cushion 12 is retained behind the front cushion 11 in the same horizontal condition. When the front cushion 11 is tilted forward as shown in FIG. 3, the support arms 22d are pulled forward to move the lower ends of link members 22a, 22b toward the front ends of guide grooves 22f and 22g. In this instance, the support legs 22c act to raise the link members 22a and 22b as shown in FIG. 10(b). When the front cushion 11 is further tilted forward, the connecting rod 22f is brought into engagement with the front ends of front guide grooves 21f to restrict forward displacement of the support arms 22d. As a result, the forward inclination of the front cushion 11 is restricted by the support arms 22d, and the upward movement of link members 22a, 22b is restricted by the support legs 22c. In such a condition, the hook 27 of retention mechanism 20d is engaged with the connecting rod 22f by abutment therewith to restrict backward movement of the connecting rod 22f. Thus, the rear cushion 12 is retained in an upper position as shown in FIGS. 3 and 10(c).

In the vehicle seat described above, the seat cushion A can be adjusted for child use as shown in FIG. 1 and adjusted for adult use as shown in FIG. 2. When it is desired to adjust the seat cushion A for child use in a condition where the front and rear cushions 11 and 12 of seat cushion A are placed in the same horizontal condition for adult use as shown in FIG. 2, the front cushion 11 is raised and tilted forward by pulling a grip 11d fixed to its rear portion. As a result, the link mechanisms 20b, 20c are interlocked with forward inclination of the front cushion 11 to raise the rear cushion 12 as shown in FIGS. 10(b) and 10(c). When the rear cushion 12 is raised to the upper position, the hook 27 of retention mechanism 20d is brought into engagement with the connecting rod 22f to restrict backward movement of the connecting rod 22f and link members 22a, 22b thereby to retain the link mechanisms 20b, 20c in a raised position. Thus, as shown in FIG. 1, the rear cushion 12 can be used as a seat cushion for child use, and the front cushion 11 can be used as a footrest for a child seated on the rear cushion 12.

When it is desired to adjust the seat cushion A for adult use, the operation string 29 is pulled against the tension spring 28 to disengage the hook 27 from the connecting rod 22f thereby to permit backward movement of the connecting rod 22f and the lower ends of link members 22a, 22b along the guide grooves 21f and 21g. In such a condition, the front cushion 11 is tilted backward and placed on the base plate 20a in a horizontal condition. In this instance, the support arms 22d are moved backward by rearward inclination of the front cushion 11 to cause backward movement of the connecting rod 22f and the lower ends of link members 22a, 22b. As a result, the link members 22a, 22b and support legs 22c are moved downward as shown in FIG. 10(b) so that the rear cushion 12 is moved down and placed horizontally on the base plate 20a behind the front cushion 11 as shown in FIG. 10(a).

As is understood from the above description, the vehicle seat is characterized in that the seat cushion A is divided into the front and rear cushions 11 and 12. With the construction of the seat cushion A, the rear cushion 12 can be enlarged in a fore-and-aft direction and in thickness to provide a comfortable seat cushion for child use. Since in the vehicle seat, the vertical movement of the rear cushion 12 is interlocked with forward and backward movements of the front cushion 11, the rear cushion 12 is raised to the upper position for child use when the front cushion 11 is tilted forward to provide a footrest for a child seated on the rear cushion 12, and the rear cushion 12 is horizontally placed on the base plate 20a for adult use when the front cushion 11 is tilted backward and placed on the base plate 20a in a horizontal condition. With such an arrangement of the front and rear cushions 11 and 12, it is able to provide a comfortable seat cushion for adult use and for child use in a simple manner.

In the vehicle seat, the lift mechanism 20 composed of the pair of link mechanisms 20b, 20c on the base plate 20a can be assembled as a unit with the front and rear cushions 11 and 12 as shown in FIG. 3. Thus, the lift mechanism 20 can be mounted on the cushion frame of the vehicle seat in a simple manner.

What is claimed is:

1. A vehicle seat having a seat cushion that comprises a front cushion pivoted at its front-side lower end on a front end of a cushion frame of the vehicle seat so as to be pivotally tilted forward or backward, and a rear cushion positioned behind said front cushion and supported by a lift mechanism mounted on a rear portion of said cushion frame, wherein said lift mechanism is composed of a pair of laterally spaced link mechanisms mounted in parallel on a base plate fixedly placed on said cushion frame, said base plate having a pair of laterally spaced upward side flanges each formed with front and rear guide grooves in the fore-and-aft direction of said cushion frame, and wherein said link mechanisms each include front and rear link members rotatably connected at their upper ends in parallel to a side portion of said rear cushion and supported at their lower ends in parallel on each upward side flange of said base plate in such a manner as to be displaced forward or backward along said front and rear guide grooves, a support leg rotatably connected at its lower end to a front end of each upward side flange of said base plate and at its upper end to the side portion of said rear cushion together with the upper end of said rear link member, a support arm rotatably connected at its rear end to the lower end of said front link member and connected at its front end to a side portion of said front cushion at a position behind a rotation fulcrum of said front cushion, and a connecting member rotatably connected at its front end to the lower end of said front link member and at its rear end to the lower end of said rear link member.

2. A vehicle seat as claimed in claim 1, wherein said link mechanisms are interconnected by means of a lateral connecting rod fixed to each lower end of said front link member at its opposite ends, and wherein said retention mechanism includes a lateral support rod rotatably supported on each upward side flange of said base plate at its opposite ends at a position spaced forward from said lateral connecting rod, a hook fixed to said lateral support rod for rotation therewith to be brought into engagement with said lateral connecting rod by abutment therewith, a spring for resiliently engaging said hook with said lateral connecting rod, and an operation member connected with said hook to move said hook against a bias of said spring.

* * * * *